(12) United States Patent
Teng et al.

(10) Patent No.: US 7,133,863 B2
(45) Date of Patent: Nov. 7, 2006

(54) METHOD AND APPARATUS TO SEARCH FOR INFORMATION

(75) Inventors: Albert Y. Teng, Cupertino, CA (US); Niraj K. Sharma, Cupertino, CA (US); Ahritta J. Kim, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 972 days.

(21) Appl. No.: 09/752,799

(22) Filed: Dec. 28, 2000

(65) Prior Publication Data
US 2002/0152199 A1 Oct. 17, 2002

(51) Int. Cl.
*G06F 17/30* (2006.01)
(52) U.S. Cl. .......................................................... 707/3
(58) Field of Classification Search ............. 707/1–10, 707/103 R, 200–206, 100–104.1; 709/202, 709/203, 214, 218, 219, 239, 242, 245, 247; 713/201; 370/352, 353; 715/505
See application file for complete search history.

(56) References Cited

U.S. PATENT DOCUMENTS

| | | | | |
|---|---|---|---|---|
| 5,696,962 | A | | 12/1997 | Kupiec ................... 707/104.1 |
| 5,867,665 | A | * | 2/1999 | Butman et al. ............. 709/239 |
| 5,987,446 | A | | 11/1999 | Corey et al. .................... 707/3 |
| 6,009,459 | A | * | 12/1999 | Belfiore et al. ............. 709/203 |
| 6,047,282 | A | | 4/2000 | Wilson et al. ................. 707/3 |
| 6,078,914 | A | | 6/2000 | Redfern .......................... 707/3 |
| 6,169,992 | B1 | | 1/2001 | Beall et al. ............. 707/103 R |
| 6,298,341 | B1 | * | 10/2001 | Mann et al. ..................... 707/3 |
| 6,311,194 | B1 | * | 10/2001 | Sheth et al. ................. 715/505 |
| 6,332,158 | B1 | * | 12/2001 | Risley et al. ................ 709/219 |
| 6,363,377 | B1 | | 3/2002 | Kravets et al. ................. 707/4 |
| 6,434,548 | B1 | | 8/2002 | Emens et al. ................... 707/3 |
| 6,442,602 | B1 | * | 8/2002 | Choudhry ................... 709/218 |
| 6,484,162 | B1 | | 11/2002 | Edlund et al. .................. 707/3 |
| 6,519,589 | B1 | * | 2/2003 | Mann et al. ..................... 707/3 |
| 6,523,037 | B1 | * | 2/2003 | Monahan et al. ............. 707/10 |
| 6,760,746 | B1 | * | 7/2004 | Schneider ................... 709/203 |
| 2002/0049756 | A1 | | 4/2002 | Chua et al. ..................... 707/3 |
| 2002/0073076 | A1 | | 6/2002 | Xu et al. ......................... 707/1 |
| 2002/0078022 | A1 | | 6/2002 | Lawton .......................... 707/3 |
| 2002/0087527 | A1 | | 7/2002 | Lawton .......................... 707/3 |

FOREIGN PATENT DOCUMENTS

| | | |
|---|---|---|
| EP | 1 209 583 A2 | 5/2002 |
| WO | WO 00/70556 | 11/2000 |

OTHER PUBLICATIONS

"Innovations in Site Search and Reporting Technology", White Paper, www.searchbutton.com, 14 pages.

"Atomz Enterprise Search", Atomz Corporation, http://www.atomz.com/services/atomz_search/01_enterprise_search.htm, Oct. 5, 2001, 4 pages.

(Continued)

*Primary Examiner*—Diane Mizrahi
(74) *Attorney, Agent, or Firm*—Rob D. Hinchliffe (57) ABSTRACT

A method and system for searching for information is disclosed. The method includes storing a plurality of content categories and identifying, according to properties returned by a plurality of search engines, at least one search engine suited to service a query where the query has at least one content category of the plurality of content categories. The system includes a processor and a machine-readable medium including instructions that when executed by the processor result in performance of the disclosed method.

15 Claims, 3 Drawing Sheets

OTHER PUBLICATIONS

"CyberDOCS Enterprise Document Management Solution", Data Sheet, Hummingbird Ltd., 2000, 2 pages.

"Autonomy Clusterizer", Product Overview, http://www.autonomy.com/autonomy_v3/Content/Products/Clusterizer, Oct. 5, 2001, 2 pages.

"Autonomy Categorizer", Product Overview, http://www.autonomy.com/autonomy_v3/Content/Products/Categorizer, Oct. 5, 2001, 5 pages.

"Verity K2 Enterprise", Technical Overview, Verity, Inc., 2001, 6 pages.

"Verity Knowledge Organizer", Product Overview, Verity, Inc., 2001, http://www.verity.com/products/ko/index.html, 2 pages.

"Verity Intranet Spider", Product Overview, Verity, Inc., 2001, http://www.verity.com/products/intspider/index.html, 1 page.

"Verity Agent Server", Product Overview, Verity, Inc., 2001, http://www.verity.com/products/agentserver/index.html, 1 page.

"AV Enterprise Search Features", Alta Vista Company, http://solutions.altavista.com/products/aves-features.html, Oct. 5, 2001, 5 pages.

"Semio Taxonomy How does it work?", Product Overview, Semio Corporation, http://www.semio.com/products/semiotaxonomy/howdoesit work.html, Oct. 5, 2001, 2 pages.

"Semio Map How does it work?", Product Overview, Semio Corporation, http://www.semio.com/products/semiomap/howdoesitwork.html, Oct. 5, 2001, 2 pages.

"Google's Custom SiteSearch", http://www.google.com/services/customsitesearch.html, Oct. 5, 2001, 3 pages.

"Google's Custom WebSearch", http://www.google.com/services/custom.html, Oct. 5, 2001, 3 pages.

\* cited by examiner

METHOD AND APPARATUS TO SEARCH FOR INFORMATION

FIELD

The invention relates to the field of searching for information, and, more particularly, to searching for information on at least one computer network.

BACKGROUND

Searching is one of the most popular applications available on computer networks such as the Internet and corporate intranets. Traditionally, there are two options for providing search applications. The first option is to purchase or license proprietary search technology. It may be very expensive to install and maintain search technology on private servers. Additionally, a customer may be "locked in" to the technology of a particular vendor, making it difficult or impossible to build integrated search solutions, or to switch vendors. The second option is known as the application service provider (ASP) model. With the ASP model, search technology is installed and maintained on the servers of a third party, the service provider. Search queries to the customer's servers invoke the search functionality of the ASP, which searches the third party servers and returns results. The ASP option may make it easier to switch search vendors and may reduce the initial expense and ongoing maintenance costs.

Neither of the traditional search options enables the selection of the best available search technology for a particular search query. This lack of flexibility leads to a "one-size-fits-all" approach to searching. Applications built with search technology cannot be designed in a vendor-independent manner. Therefore, a need exists for inter-search technology protocols to locate and match the best search technologies to service a particular query.

FIGURES

The invention may be better understood with reference to the following figures in light of the accompanying description. The present invention, however, is limited only by the scope of the claims at the concluding portion of the specification.

DESCRIPTION

In the following description, numerous references to "one embodiment" or "an embodiment" do not necessarily refer to the same embodiment, although they may. In the figures, like numbers refer to like elements.

The present invention provides a user-interface, data organization, and protocols for locating information using search technologies suited to the information to locate. Protocols include facilities to pass queries to the search engines and return results. Protocols further include facilities for exchanging search engine capabilities, user profile information, search logs, and other information to be described.

Herein, various reference is made to the term "search engine." The meaning of "search engine" should be understood to comprise any technology capable of searching for information according to a received query.

Figure 1:
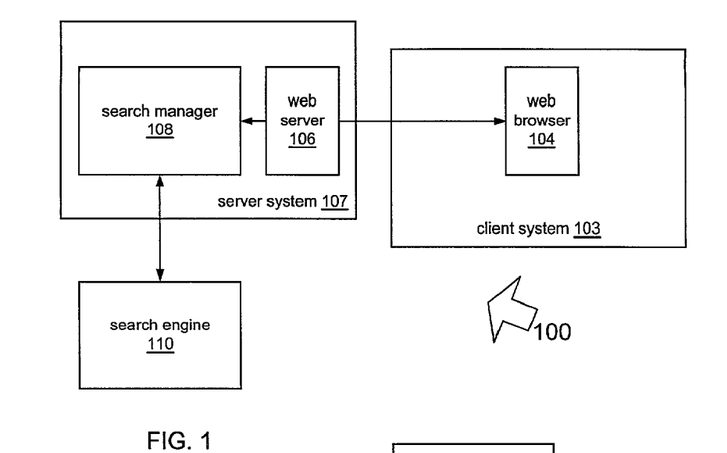
FIG. 1 shows a system embodiment in accordance with the present invention.

FIG. 1 shows a system embodiment 100 in accordance with the present invention. The client system 103 interacts with a search manager 108 of a server system 107. Interaction may take place by way of a web browser 104 in communication with a web server 106. Client system 103 may comprise a computer system, such as a personal computer, handheld computer, laptop computer, set top box, and so on. In general, any device comprising a processor and memory to store instructions and data for execution and manipulation by the processor, may serve as client system 103.

The web browser 104 enables the client 103 to communicate with servers of a computer network, such as the Internet or a corporate intranet. The client 103 may submit a search query to the server 107 by way of the web browser 104. The search query may have certain properties, such as search scope. One example of a search scope is a date restriction, e.g., to return only documents having a creation date later than a certain date, or before a certain date, or between dates, etc. Other examples of scope are content author and content language, to name just a few.

The search query may be received by the web server 106, which forwards the query to the search manager 108. The search manager 108 may associate content categories with the query. The search manager 108 may identify a suitable search engine, such as search engine 110, to service queries having the associated content categories. The search manager 108 may further identify specific domains of the search engines which are suitable to the content categories and other properties of the query (such as scope). The search manager 108 may pass the query to the search engine 110 using various protocols to be discussed. The search engine 110 may perform the search and return search results to the search manager 108, again via the protocols. Although only a single search engine 110 is shown, the search manager could pass the query to multiple search engines.

The search manager 108 is distinguished from the search engine 110, in that the search manager may not directly perform actual searching. The search manager 108 is capable of communicating with one or more search engines which perform searching. The search manager 108 may also perform searching, although this need not be the case.

Figure 2:
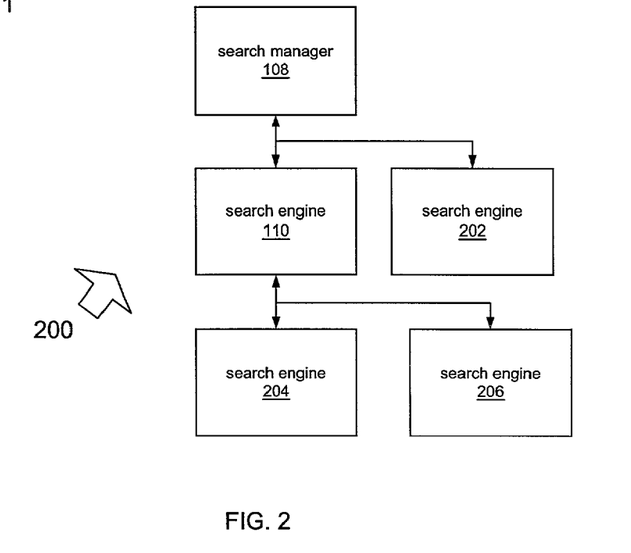
FIG. 2 shows an embodiment of a system in accordance with the present invention.

FIG. 2 shows an embodiment 200 of a system in accordance with the present invention. The search manager 108 may identify and communicate with a plurality of search engines suited to servicing a particular query. The search manager 108 may accomplish this, for example, by ascertaining the search capabilities of the search engine 110. These capabilities may include content categories and scopes to which the search engine 110 is best suited. These capabilities may be identified as a collection of properties returned to the search manager 108 by the search engine 110. These properties may assist the search manager 108 in ascertaining the search technology's suitability to handling a particular query. The search manager 108 may query another search engine 202 in a similar fashion. In fact, the search engines 110 and 202 may be part of a set of search engines queried by the search manager 108.

The search engine 110 may communicate with the search engines 204 and 206, to ascertain their properties, using protocols in accordance with the present invention. The search engine 110 may apply properties returned by engines 204 and 206 to ascertain whether either or both are suitable candidates for servicing particular queries. The search engine 110 may query engines 204 and 206 for their properties and may include these with its own properties in response to a query for properties from the search manager 108.

Once the properties of the various search engines are known, the search manager 108 may identify which particular search engines are most suitable for servicing a particular query to locate information. For example, the search engine 110 may be identified based upon the properties returned to the search manager 108. Using protocols in accordance with the present invention, the search manager 108 may submit the query to locate information to the search engine 110, possibly specifying domain or scope restrictions for the search. The search engine 110 may attempt to service the query, and may also communicate the query to search engines 204 and 206. Search engines 204 and 206 may also attempt to service the query, and may return search results to the search engine 110. The search engine 110 may merge these returned search results with the results of its own attempt to service the query, and the merged query results may be returned to search manager 108. All of this may be carried out using protocols in accordance with the present invention. The search manager 108 may return the complete search results to the client 103 which initiated the query.

Figure 3:
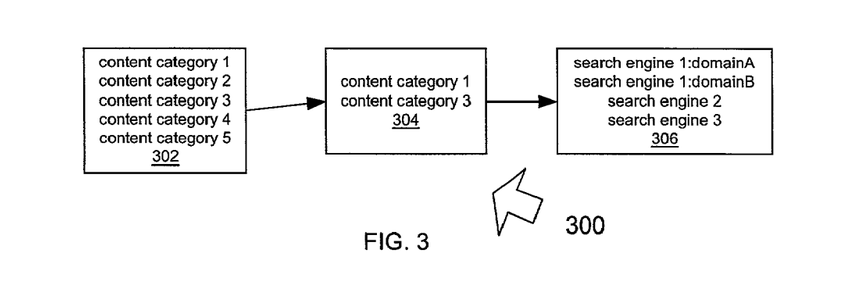
FIG. 3 shows an embodiment of a mapping scheme in accordance with the present invention.

FIG. 3 shows an embodiment 300 of a mapping scheme in accordance with the present invention. The mapping scheme 300 may be employed to define a set of search engines to employ for servicing a query to locate information. Content category selections 304 are made from a set 302 of available content categories. Content categories are broad classifications of content; for example "sports", "weather", "finance", etc. Selected content categories 304 are mapped to a set 306 of suitable search engines and possibly also to domains for locating content in those content categories. Mapping of selected content categories 304 to suitable search engines 306 may be accomplished in various ways, for example, by way of a lookup table or database which maps content categories to search engines. The database and/or lookup table may be kept current by using protocols to request the properties of available search engines whenever desired. A set of one or more domains may be associated with a particular search engine. When the search manager 108 receives a query, selected content categories may be associated with the query. The selected categories may map to particular search engines and domains best suited to the query.

Search domains may comprise a set of one or more servers which provide the physical storage for documents. Domains may have certain attributes, such as branding, copyright, and access policies. Other attributes of domains may include the domain's availability for searching, and a range of dates for the documents of the domain (e.g. scope). Content categories may be independent of the search domain. For example, a single content category of "sports" may comprise several—or several hundred—domains. Some domains might be internal to an organization (part of an intranet), whereas others of these domains may be on the World Wide Web (the Internet). The set of underlying web domains for "sports" could change daily, along with the associated search engines, but the content category would remain "sports".

Figure 4:
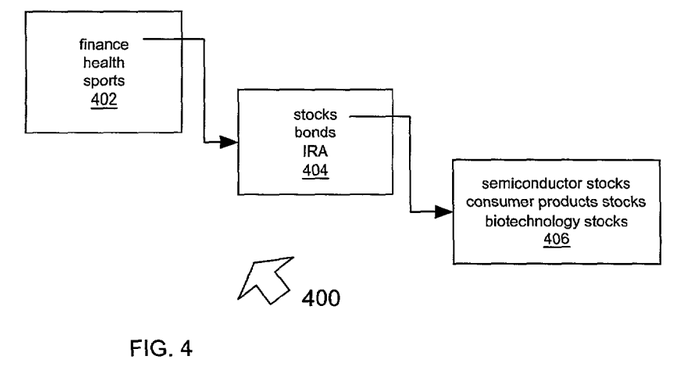
FIG. 4 shows a category taxonomy embodiment in accordance with the present invention.

It may be possible to query a search engine for properties of its associated domains, such as the name and description of a domain, a count of the number of documents or other information sources available on the domain, a range of dates associated with the information on the domain, and copyright and branding information for the domain. Content categories may be arranged in a taxonomy. FIG. 4 shows a category taxonomy embodiment 400 in accordance with the present invention. High level content categories 402 include finance, health and sports. Within the finance category are other categories 404, including stocks, bonds, and IRA. In other words, categories may be the parents of other categories. The stocks category includes the categories of semiconductor stocks, consumer products stocks, and biotechnology stocks 406. Of course, resolution into finer categories can continue indefinitely. In one embodiment, in addition to a parent-child relationship, categories may also be associated with other related categories in addition to parents, children, and siblings.

Figure 5:
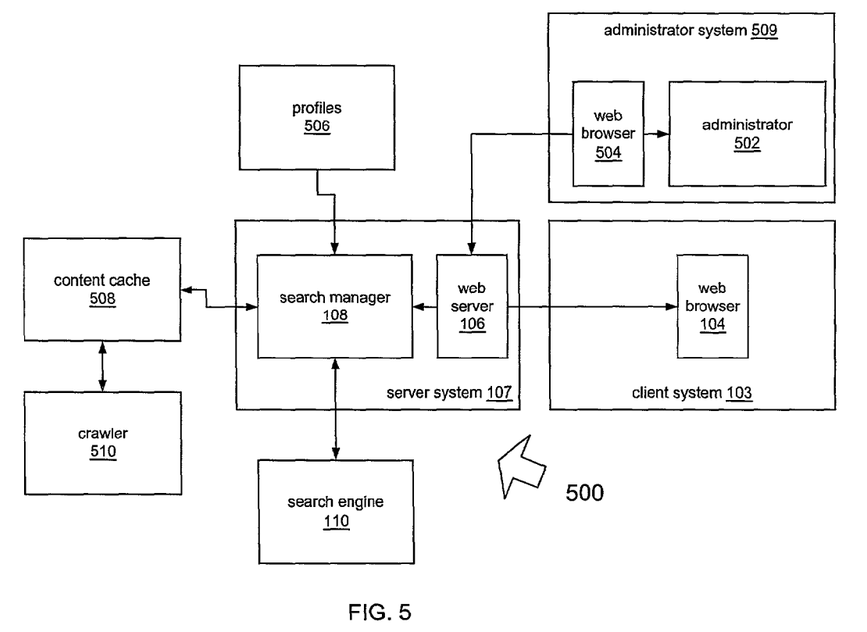
FIG. 5 shows a system in accordance with the present invention.

FIG. 5 shows a system in accordance with the present invention. An administration system 509 includes an administrator application 502 and web browser 504. The administrator 509 may communicate via web server 106 to the server 107. The administrator system 509 may be employed to configure a content category taxonomy for the search manager 108. The administrator system 509 may be further employed to configure a mapping of content categories to domains. In one embodiment, the taxonomy and mappings may be stored by the server 107. Of course, the taxonomy and mapping could also be stored elsewhere, including in a fashion distributed among servers of the network. For example, each available search engine could store its own content categories and associated mapping of content categories to domains, which might then be merged to produce a complete taxonomy.

The administrator 509 may also be employed to associate access policies with search engines and/or search domains. For example, some search domains may require an authentication procedure, or certain payment terms, before allowing a search to proceed. Further, the administrator 509 may be employed to define a set of one or more default search engines and/or domains for particular content categories. It may be possible for a user, upon submitting a query, to override these defaults by explicitly specifying a set of search engines and/or domains. The administrator 509 may also be employed to set policies for the order in which search results should be returned from multiple search engines and/or domains, and how multiple sets of search results should be merged (duplicate elimination, etc.).

The search manager 108 may read user profile information from a profile database 506. Profile information for a user may comprise information about prior searches submitted by the user, as well as a user's preferences. Using the profile information, the search manager 108 may instruct the search engine 110 to update the results of the user's prior searches. The updated results of the user's prior searches may be stored in the content cache 508. The user may access these results, which may then reflect more recently available information. A web crawler 510 may be employed to direct the updating of prior search results on a periodic basis.

The user profile information may also be provided to search engines so that when a search query is received from a particular user, the search engines may determine how many search results to return, how to interpret various search terms, and so on.

Figure 6:
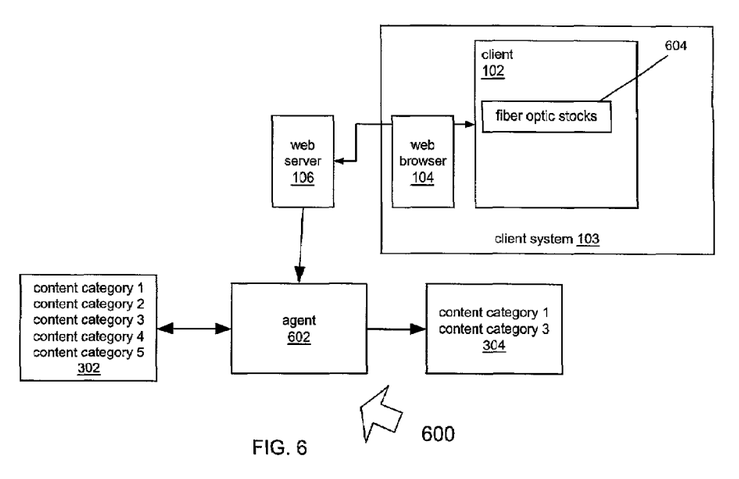
FIG. 6 shows an embodiment of a system in accordance with the present invention.

FIG. 6 shows an embodiment 600 of a system in accordance with the present invention. An agent 602 may be employed to facilitate a selection of content categories most suited to a query. The client 103 generates a query 604. By way of example, the query is "fiber optic stocks". Of course this is merely one possible query. The query is submitted to the agent 602, which comprises intelligence for ascertaining relevant content categories, sub-categories, sub sub-categories, etc. most suited to the query. Using said intelligence, the agent 602 identifies suitable categories 304 from the set of available content categories 302. For example, the selected content category 1 may comprise "semi-conductor stocks", and the selected content category 3 may comprise "telecommunication stocks". The selected content categories 304 may be mapped to search technologies and search domains most suited to servicing the categories "semi-conductor stocks" and "telecommunication stocks."

The agent may further apply user profile information from a profile database 506 in determining the selected content categories. For example, the user profile information may indicate that the user has frequently submitted queries to locate information on the World Cup. Thus, thus upon receiving a query including the term "football", the agent would tend to select content categories related to "soccer" over categories related to National Football League-style football.

In one embodiment, the scope of a search may be limited to information having a particular creation date or range of creation dates—for example, documents created on or after Jul. 1, 2000. The search scope may also be limited to content from one or more particular domains.

Figure 7:
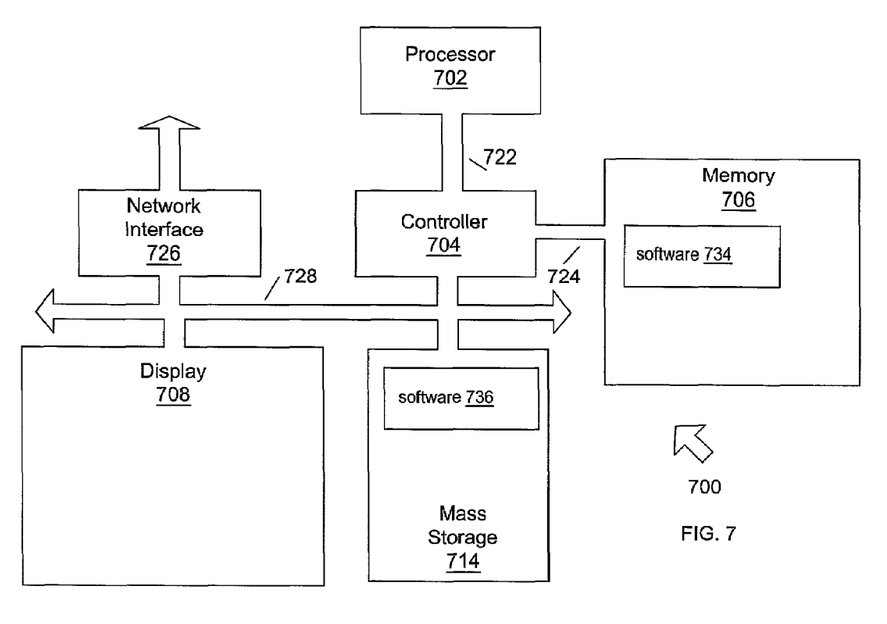
FIG. 7 shows a server embodiment in accordance with the present invention.

FIG. 7 shows a server embodiment 700 in accordance with the present invention. Embodiment 700 comprises a processor 702 coupled to a controller 704 by way of a processor bus 722, commonly referred to as a front side bus. Bus controller 704 is coupled to memory 706 via memory bus 724. Bus controller 704 is also coupled to various peripheral devices such as mass storage 714, network interface 726, and display 708 via I/O bus 728. Network interface 726 provides apparatus 700 with access to networks such as the Internet or corporate intranets. Memory 706 stores a software embodiment 734 to perform search management operations, and/or web server operations, and/or agent operations, including communication with search engines and mappings, as herein described and in accordance with the present invention. Software 734 may be stored in memory 706 in a form suitable for access and execution by processor 702. An archived loadable form 736 of software 734 may be stored by mass storage 714 for loading into memory 706 for execution by processor 702. Mass storage 714 may comprise any form of non-volatile memory including hard drives, CD ROM drives, ZIP drives, diskettes, and so on.

Memory 706 is typically a form of random access memory (RAM) such as a DRAM, flash memory, SDRAM, and so on. Memory 706 supplies the instructions of software 734 stored therein to processor 702 for execution. Execution of software embodiment 734 by processor 702 may result in a process to perform search management, and/or web server operations, and or agent operations, including mappings and communication with search engines, as herein described and in accordance with the present invention.

Of course, those skilled in the art will appreciate that other embodiments could comprise and software, hardware, and firmware, or any combination thereof, to carry out the operations of the present invention as well.

Details of one embodiment of communication protocols between search managers and search engines, and search engines and search engines, will now be described. Communication between these components may include connection, message exchange, encoding, message format, message syntax, and message schema. Connection is the process of establishing communication. Message exchange involves the exchange of particular messages designed to elicit particular actions and responses. Encoding is the manner in which the data in messages is represented for the purposes of security, size, and reliability. Message format is the high-level data organization to which the message conforms, such as Extensible Markup Language (XML) or Extensible Style Sheets (XLS). Message syntax is the grammar and rules for parsing a message format. Message schema is the particular field interpretations for the message format.

In an embodiment, connection and encoding may comply with Hypertext Transfer Protocol (HTTP) or the Secure Hypertext Transfer Protocol (HTTPS), although other connection and encoding protocols are certainly possible. The message format may comprise XML, XLS, or the widely available but potentially more limited HTTP GET and HTTP POST command formats. Message exchange may include messages to initiate searches, return search results, return search activity logs, and return search engine domains and capabilities, among others. Message syntax may comprise the well-known Internet URL message syntax (henceforth, the Internet syntax), a subset of the Internet syntax (henceforth Internet Light), Structured Query Language (SQL), and many others. Message schema will vary according to the particular message format and syntax. One embodiment of a message syntax and schema is described in more detail in Tables 1 and 2.

The protocols may include facilities to retrieve search activity logs from search engines. Search activity logs comprise properties of prior searches performed by a search engine. Properties may include the text or terms of the search query, the type of the return data (documents, statistics, etc.), time and date of the search, the client making the search request, and so on.

As previously described, it may be expedient to merge search results returned from multiple search engines. Typically, each search engine will assign a unique (unique within the returned results) identifier to each "document", e.g. container of information, in the return results. However, when results are returned from multiple search engines, these identifiers may collide, that is, may apply to more than one document in the merged results, even when the documents are different. In one embodiment, a search engine id is combined with the document id for each returned document, so that there are no duplicate identifiers in the merged results even when document ids from separate search engines collide.

It is also possible that the search results from a first search engine may identify a document which is the same as a document identified in the results returned from a second search engine. These are known as duplicates. Each search engine may assign the document a different identifier. Thus, the document would be identified in the merged search results using two different identifiers. To correct for this possibility, in one embodiment the Uniform Resource Locators (URLs) associated with each returned document are examined. When the URLs of two documents are identical, one of the documents may be removed from the list of search results, or otherwise identified as a duplicate.

In one embodiment, communication between search managers and search engines, and between search engines, is accomplished by way of a Common Gateway Interface (CGI) entry point. This entry point may have a "standard", e.g. predetermined, name, such as "/_search". This entry point may be located in the root directory of a web server, which operates on port 80, in manners well known in the art. A message may be submitted to the search engine that includes information comprising "query='a phase'" where "query" is a keyword which indicates that the text which follows defines a query. See Table 2 for more details about one embodiment of a query message schema, including keyword definitions and their meanings.

In one embodiment, the query message schema may support more than just queries to locate and return documents matching a certain criteria. The schema may support messages to return a set of domains which may be accessed by a search engine, to return activity logs from a search engine, to return categories supported by a search engine, and search statistics, to name just some of the possibilities.

Table 1, below, describes one embodiment of a query message schema in more detail.

| Keyword | Description | Predefined Valid Values | Default |
| --- | --- | --- | --- |
| query | Identifies a search string. | | |
| syntax | Identifies the syntax of the search string passed in the query field. | internet, internet_light, sql, text | internet |
| format | Identifies the format of the returned results. | xml, html_compatible, xsl_reference, xsl_render | html_compatible when GET and POST are used for message exchange; xml otherwise |
| xsl | Identify an xsl style sheet to use when format of return results is xls_*. If format=xsl_reference, then a reference to that style sheet will be included in the header of the document. If format=xsl_render, then the document xsl style sheet is used to format the results before returning the results. | | |
| objects | Define the type of the return data. Some types may be combined; for example, search_summary and document_list, when combined, specify that a summary of matching documents is to be returned. | search_statistics, document_list, search_variables, raw_documents, processed_documents, data_sources, search_servers | For a non-null search: search_summary, document_list, search_variables. For a null search (empty or missing search string): search_summary and search_variables. |
| url | Limit the set of searched documents to those at a location beginning with this URL fragment. | | |
| min_date / max_date | Limit searched documents to a range of dates. | | |
| daysold | Limit searched documents to those created a number of days back from current date. | | |
| fetch | Limit the search to a set of one or more specified documents. | | |
| session_id | Identifies a search session. | | |
| search_id | Identifies a particular search. There can be multiple searches within a search session, each having a different id. | | |
| user_id | Identifies a user (a party submitting search messages). | | |
| passthrough_data | XML encoded data that is to be passed through to the search engine. This data may have an engine-specific syntax and schema within the XML format. | | |
| user_data_buffer | XML encoded data that can be passed in to a | | |

-continued

| | | | |
|---|---|---|---|
| | search engine, modified, and passed back as part of the results. Again, this data may have an engine-specific syntax and schema within the XML format. | | |
| preprocess_xsl | Apply an XSL file to format a query message before sending it to the search engine. | | |
| preprocess_url | Apply a CGI or other program invoked via URL to format the query message before sending it to the search engine. | | |
| how_many | Defines the number of matching documents (or other data types) in return results. | | 10 |
| offset, skip | Defines the number of matching documents (or other data types) to skip over before returning results. Useful for implementing a "next X search results" and "previous X search results" functionality. | | 0 |
| sources | Defines a set of domains to search. An * indicates that all available search domains should be searched. | * | Typically, all domains. |
| max_time | Maximum time in milliseconds that may elapse before a search message times out. | | 500 ms |

Message syntax definitions:

| | |
|---|---|
| internet | Indicates that the message conforms to the well-known Internet URL syntax. |
| internet_light | Indicates that the message conforms to a subset of Internet URL syntax. |
| sql | Indicates that the message conforms to the SQL syntax. |
| text | The message is text. |

Format definitions:

| | |
|---|---|
| xml | The format is XML. |
| html_compatible | The format is compatible with HTTP GET and POST commands. |
| xsl_reference | Identifies an XLS style sheet associated with a document. |
| xsl_render | Indicates that the return results should be formatted with an XLS style sheet associated with a document before returning. |

Return data type definitions:

| | |
|---|---|
| search_statistics | Return statistics about the search results (number of documents matched, document ranks, etc.). Statistics may be available for each domain which is searched. |
| document_list | Return a set of matched documents, either raw or pre-processed. |
| search_variables | Return the terms which were searched for. |
| raw_documents | Return a matching set of documents without first processing the documents. |
| processed_documents | Return a matching set of documents after first processing the documents. Processing is search-engine specific and can include such operations as highlighting the matched search terms, translating documents to another language, summarizing or condensing the documents, and altering the format of the documents. |

-continued

| | |
|---|---|
| data_sources | Return a set of identifiers of available search domains. |
| search_servers | Returns a set of available search engines. Return results will include a primary search engine; this is the search engine which initially receives the query message from the client. |

Table 2 below identifies one embodiment of a search string syntax and schema in accordance with the present invention.

| Elements | Meaning |
|---|---|
| word/phrase | Any word not including the special term symbols defined below. Phrase: any number of words separated by white space, commas, or other agreed-upon delimiter. |
| "a phrase" | Search for "a phrase" |
| +term | This term is required for a match |
| −term | This term is excluded (e.g. must not be present) for a match |
| Fieldname:term | Search for the term in the field identified by fieldname (valid fieldnames: url, title, description, date, keywords, alt) |
| term and term | Both terms must be present for a match |
| term or term | Either term may be present for a match |
| not term | Match documents not having this term |
| (term) | Parse term first before combining with surrounding terms |
| [[text]] | Pass through text to search-engine without applying syntax parsing rules. |

The title, description, date, alt, and keywords fields are well-known meta-data fields which may be included in documents to facilitate searches. The URL field describes a documents URL.

While certain features of the invention have been illustrated as described herein, many modifications, substitutions, changes and equivalents will now occur to those skilled in the art. It is, therefor, to be understood that the appended claims are intended to cover all such embodiments and changes as fall within the true spirit of the invention.

What is claimed is:

1. A method comprising:
storing a plurality of content categories; and
identifying, according to properties returned by a plurality of search engines, at least one search engine suited to service a query having at least one content category of the plurality of content categories.

2. The method of claim 1 in which identifying the at least one search engine further comprises:
identifying at least one domain of the at least one search engine suited to service the query.

3. The method of claim 1 further comprising:
analyzing the content of a query to determine the at least one content category of the query; and
identifying at least one domain of the at least one search engine suited to service the query according to the content category.

4. The method of claim 2 in which identifying at least one domain of the at least one search engine suited to service the query further comprises:
identifying the at least one domain according to a scope of the query.

5. The method of claim 1 in which at least one content category of the plurality of content categories further comprises:
child categories.

6. An article comprising:
a machine-readable storage medium storing instructions which, when executed by a processor, result in:
storing a plurality of content categories; and
identifying, according to properties returned by a plurality of search engines, at least one search engine suited to service a query having at least one content category of the plurality of content categories.

7. The article of claim 6 in which execution of the instructions to identify the at least one search engine further results in:
identifying at least one domain of the at least one search engine suited to service the query.

8. The article of claim 6, further comprising instructions which, when executed by the processor, result in:
analyzing the content of a query to determine the at least one content category of the query; and
identifying at least one domain of the at least one search engine suited to service the query according to the content category.

9. The article of claim 7 in which execution of the instructions to identify the at least one domain of the at least one search engine suited to service the query further results in:
identifying the at least one domain according to a scope of the query.

10. The article of claim 6 in which at least one content category of the plurality of content categories further comprises:
child categories.

11. A system comprising:
a processor; and
a machine-readable storage medium storing instructions which, when executed by the processor, result in:
storing a plurality of content categories; and
identifying, according to properties returned by a plurality of search engines, at least one search engine suited to service a query having at least one content category of the plurality of content categories.

12. The system of claim 11 in which execution of the instructions to identify the at least one search engine further results in:
identifying at least one domain of the at least one search engine suited to service the query.

13. The system of claim 11, further comprising instructions which, when executed by the processor, result in:
analyzing the content of a query to determine the at least one content category of the query; and
identifying at least one domain of the at least one search engine suited to service the query according to the content category.

14. The system of claim 12 in which execution of the instructions to identify the at least one domain of the at least one search engine suited to service the query further results in:
 identifying the at least one domain according to a scope of the query.

15. The system of claim 11 in which at least one content category of the plurality of content categories further comprises:
 child categories.

* * * * *